Aug. 8, 1967 U. R. JAEGER 3,334,400
METHOD OF PRODUCING HEAT EXCHANGERS
Filed Dec. 7, 1964 5 Sheets-Sheet 1
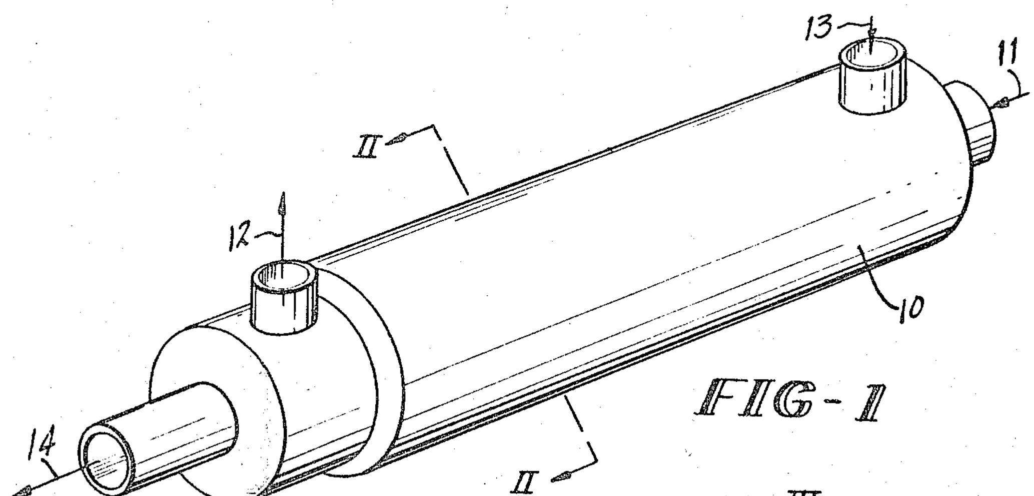
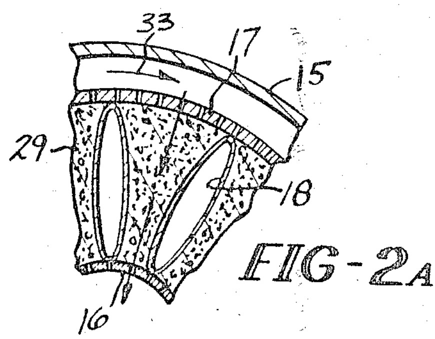
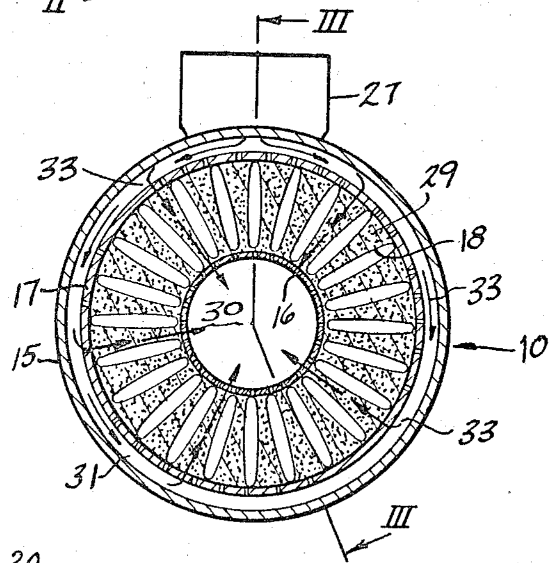
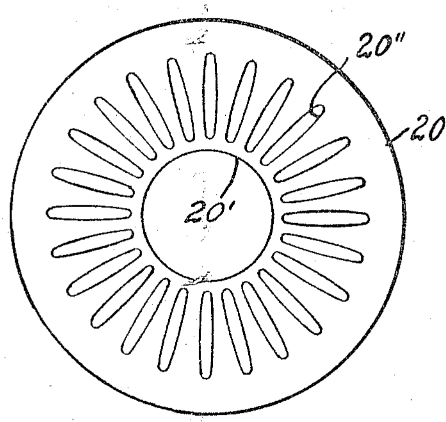
FIG-4
INVENTOR.
ULRIC R. JAEGER
BY Robert H. Bachman
ATTORNEY

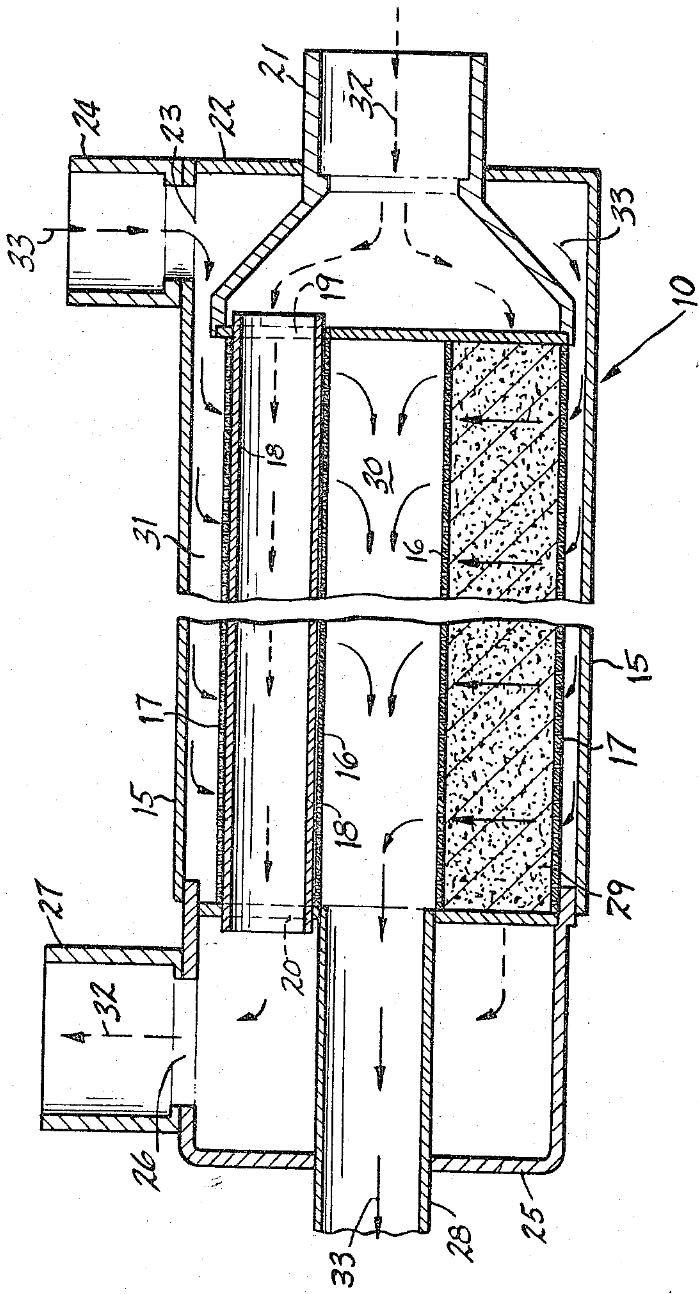
INVENTOR.
ULRIC R. JAEGER
BY Robert H. Bachman
ATTORNEY

INVENTOR.
ULRIC R. JAEGER
BY Robert H. Bachman
ATTORNEY

METHOD OF PRODUCING HEAT EXCHANGERS

Filed Dec. 7, 1964 5 Sheets-Sheet 4

INVENTOR.
ULRIC R. JAEGER
BY Robert H. Bachman
ATTORNEY

METHOD OF PRODUCING HEAT EXCHANGERS

Filed Dec. 7, 1964 5 Sheets-Sheet 5

INVENTOR.
ULRIC R. JAEGER
BY Robert H Bachman
ATTORNEY

United States Patent Office 3,334,400
Patented Aug. 8, 1967

3,334,400
METHOD OF PRODUCING HEAT EXCHANGERS

Ulric R. Jaeger, Greenwich, Conn., assignor to Olin Mathieson Chemical Corporation, a corporation of Virginia Filed Dec. 7, 1964, Ser. No. 416,449
7 Claims. (Cl. 29—157.3)

ABSTRACT OF THE DISCLOSURE

This invention is a process for producing a tubular heat exchanger comprising placing a central core within a tubular member, positioning a plurality of conduit means in the space between the core and the tubular member, placing particulate material in the remaining space between the core and the tubular member, bonding the individual particles together and to the conduit means, removing the core and then the tubular member, and placing the resulting pervious body containing the conduit means in a tubular heat exchanger.

Figure 5:
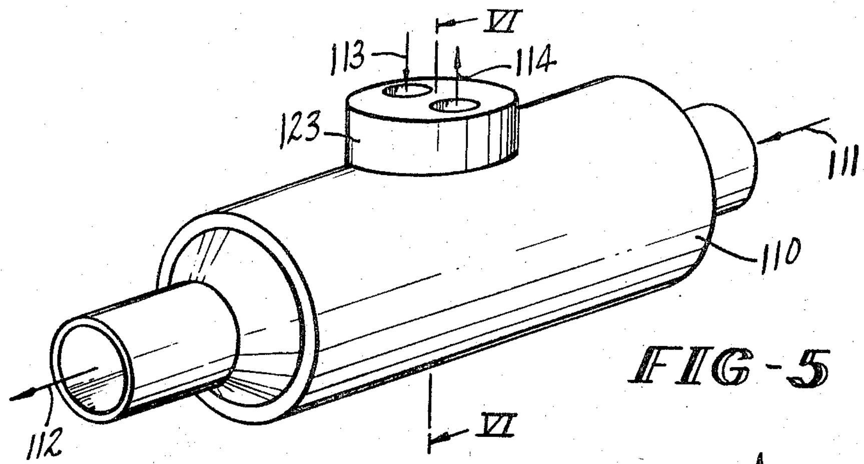

This application is a continuation-in-part of my copending application Ser. No. 404, 123, filed Oct. 15, 1964, now U.S. Patent 3,289,756, issued Dec. 6, 1966.

This invention relates generally to heat exchangers, and more particularly to a novel method of producing a heat exchanger having a body of pervious material therein.

As is known in the heat exchanger art, the greatest heat exchange is achieved by providing the maximum possible area of heat exchange surface across which the desired heat exchange may take place. Various devices have been employed to so increase the area such as, for example, fins or corrugations across which pass the media between which the heat exchange is to take place. However, it has been found that greatly increased heat transfer surfaces can be achieved by instead employing a body of pervious material, or a porous body having interconnected voids. Such a body of pervious material presents a large number of faces for heat exchange purposes, as well as other advantages to be discussed shortly.

By the instant invention there is provided a method of producing a heat exchanger having a unique configuration and arrangement of such a pervious body within a heat exchanger which has been tested and found to result in greatly increased heat exchange properties. The concept of the instant invention may be employed in heat exchangers of any desired shape, but is particularly adapted to tubular heat exchangers. As known in the art, the use of heat exchangers of a tubular configuration is highly advantageous in certain environments where it is desired that the heat exchange take place wholly within the exchanger. The tubular heat exchangers commonly in use in such an environment are of the type known in the art as "shell and tube," wherein a plurality of tubes conveying one heat exchange medium are arranged within a shell through which is circulated another heat exchange medium, with or without the use of baffles to direct the flow, which is substantially axial along the tubes.

In the concept of the instant invention there is provided a method of producing a heat exchanger in which not only the heat exchange area is increased but the medium flow is directed in a radial path between and around a series of inner tubes. The advantages resulting from such a flow are achieved by the provision of a pervious body completely encasing the series of inner tubes. By a particular construction of the tubes and the pervious body, to be discussed hereinafter, space is provided within the heat exchanger to serve as guide channels for the heat exchange media resulting in the desired radial flow.

It is accordingly an object of this invention to provide a method for producing a heat exchanger which is compact and yet capable of high efficiency and low pressure drop.

It is a further object of this invention to provide a method for producing such a heat exchanger having a body of pervious material joined therein by a metallic bond.

It is a still further object to provide a method for producing such a heat exchanger comprising a tubular member having a plurality of inner tubes bonded in a body of pervious material.

Figure 6A:
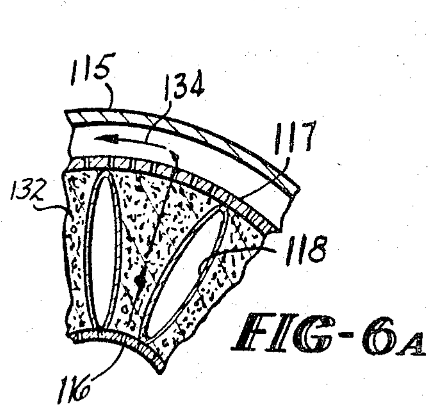
Figure 6:
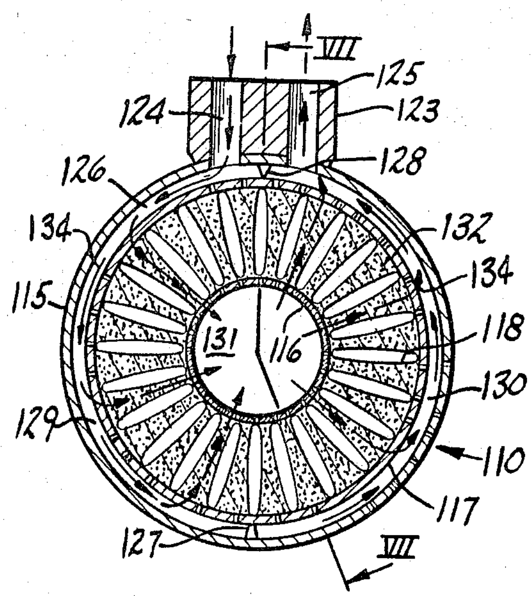
Figure 8:
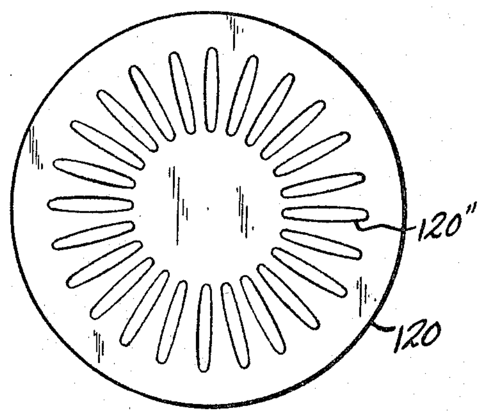
Figure 7:
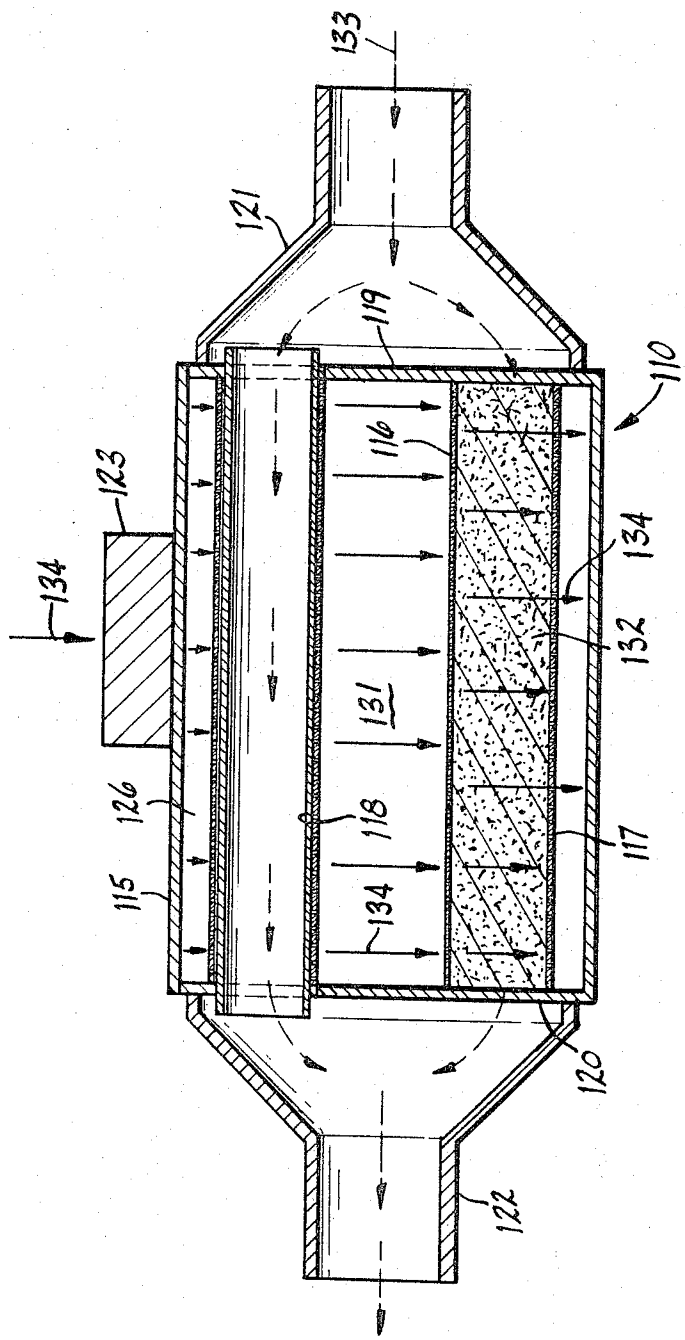
Figure 9:
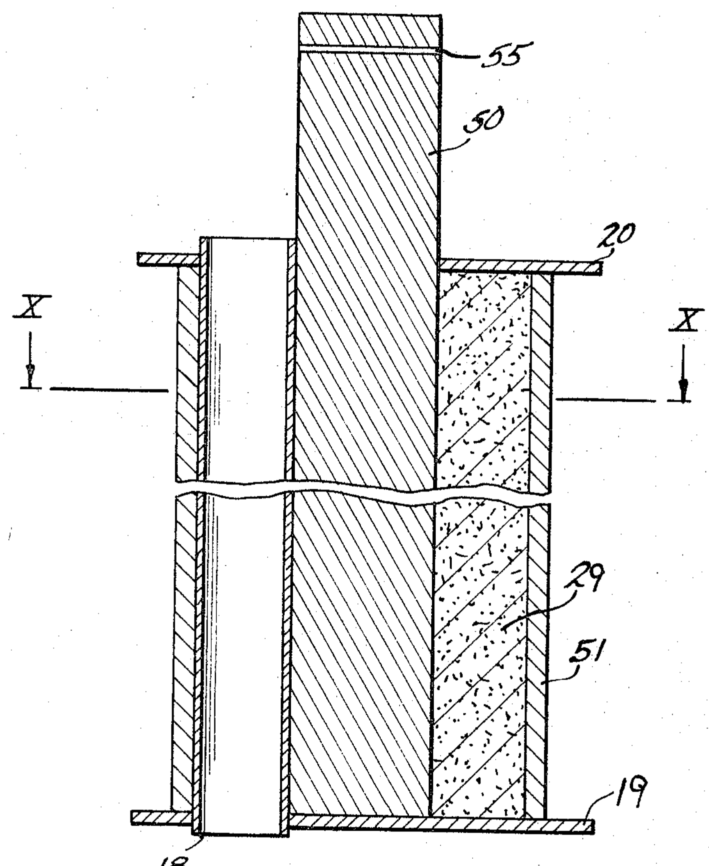
Figure 10:
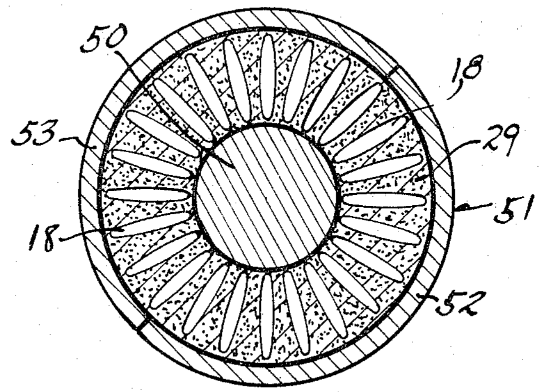

Additional objects and advantages will become apparent to those skilled in the art from a consideration of the details of several specific embodiments illustrated in the drawings, in which:

FIGURE 1 is a perspective view of a first embodiment of a heat exchanger produced by a method according to this invention, FIGURE 2 is an axial cross-section of the heat exchanger of FIGURE 1, taken along the lines II–II thereof, FIGURE 2A is an enlarged section of a portion of FIGURE 2, FIGURE 3 is a longitudinal cross-section of the heat exchanger of FIGURE 1, taken along the lines III—III of FIGURE 2, certain portions being deleted for the sake of clarity, FIGURE 4 is a frontal view of one of the header plates employed in the heat exchanger of FIGURE 1, FIGURE 5 is a perspective view of a second embodiment of a heat exchanger produced by a method according to this invention, FIGURE 6 is an axial cross-section of the heat exchanger of FIGURE 5, taken along the lines VI—VI thereof, FIGURE 6A is an enlarged portion of FIGURE 6, FIGURE 7 is a longitudinal cross-section of the heat exchanger of FIGURE 5, taken along the lines VII—VII of FIGURE 6, certain portions being deleted for the sake of clarity, FIGURE 8 is a frontal view of one of the header plates employed in the heat exchanger of FIGURE 5, FIGURE 9 is a longitudinal cross-section through a device for producing the pervious body, and FIGURE 10 is an axial cross-section of the device of FIGURE 9, taken along the lines X—X thereof.

An understanding of the function of heat exchangers produced according to this invention being helpful in appreciating the precise method employed, several embodiments of a heat exchanger will first be described, followed by a description of the method of producing each. Thus, a first embodiment of heat exchanger is shown in FIGURE 1, and is designated generally by 10. A first heat exchange medium, for example the medium to be employed in heating or cooling, is introduced into the heat exchanger 10 at one end thereof, as shown by the arrow 11, and exits from the opposite end thereof in the direction of the arrow 12. A second heat exchange medium, for example the medium to be cooled or heated, enters the heat exchanger 10 through any suitable fitting in the direction of the arrow 13, is circulated through the heat exchanger, and exits through a suitable fitting in the direction of the arrow 14. It will be obvious that any desired media might be employed in the instant heat exchanger; for example, the medium introduced at 11 may be water and that introduced at 13 may be oil.

The construction of the heat exchanger 10 is shown in detail in FIGURES 2, 2A, 3 and 4. Referring first to FIGURES 2, 2A and 3, it may be seen that the heat exchanger 10 comprises a tube 15 in which, according to one method of producing the heat exchanger, there may be situated two cylindrical screens 16 and 17. Between the screens 16, 17 are situated a plurality of tubes 18 radially oriented as shown in FIGURE 2, each of the tubes being of any desired configuration. FIGURE 2A, which is an enlargement of a portion of FIGURE 2 to show the tubes more clearly, discloses the tubes as being of an oval cross-section, but this configuration is not the only possible one. For example, each of the oval shaped tubes 18 might be replaced by a number of stacked tubes of circular cross-section, either radially aligned or staggered. The tubes 18—and when the screens 16, 17 are employed, the screens also—are secured to header plates 19, 20, at each end thereof. The header plate 20, which is shown in FIGURE 4, is apertured centrally thereof as at 20', for reasons to become evident. There is also provided in the header plate 20 a plurality of apertures 20'', each of a configuration to receive a tube 18. Similar apertures are provided in the header plate 19 so that when the tubes 18 are inserted in the apertures and appropriately secured to the header plates 19 and 20, an available passage is provided through the apertures of the header plates 19, 20 and the aligned tubes 18.

Referring now more particularly to FIGURE 3, at one end of the heat exchanger 10 a suitable inlet fitting 21 is attached to the header plate 19 in any suitable manner. The end of the heat exchanger 10 adjacent the fitting 21 is closed off in any suitable manner, as by an end plate 22 having an aperture closely receiving the fitting 21. An opening 23 is provided in the end of the heat exchanger adjacent the fitting 21, and any suitable fitting 24 is provided, to which required connections may be made for fluid flow. At the opposite end of the heat exchanger 10 an end cap 25 is suitably connected to the header plate 20. The cap 25 is apertured as at 26 and a suitable fitting 27 allows for a required connection like that at 24. Passing centrally into the cap 25 is a tube 28 in communication with the space centrally of the tubes 18, or within the screen 16 when such a screen is employed.

Between and surrounding the tubes 18 there is provided a body of pervious material 29 extending the full length of the tubes 18. The pervious body 29 may be produced in a number of methods to be indicated shortly. In any event, it will be seen that there is provided within the heat exchanger 10 a central passage 30 and an outer annular passage 31. A first medium, for example that to be employed in heating or cooling, enters through the fitting 21 and, following the path of the dashed arrows 32 flows through the apertures of the header plate 19 into the tubes 18, axially along the length thereof and through the corresponding apertures 20'' of the header plate 20, collecting within the end cap 25, and thence out through the fitting 27. The second medium, for example that to be heated or cooled, enters the heat exchanger through the fitting 24, and following the path of the solid arrows 33 flows into the annular passage 31, thence radially through pervious body 29 (as shown in FIGURE 2 by the arrows 33), collecting in the passage 30, from which it may pass through the aperture 20' of header plate 20 and out of the heat exchanger through tube 28. It will be evident that the first medium is prevented from entering the passage 30, since the header plate 19 is not apertured centrally thereof in the manner of header plate 20.

While the flow directions indicated above have been found to be the most desirable, the direction of flow of either or both of the heat exchange media may be reversed if so desired.

A second embodiment of heat exchanger is shown in FIGURE 5 and is designated generally by 110. A first heat exchange medium, for example the medium to be employed in heating or cooling, is introduced into the heat exchanger 110 at one end thereof, as shown by the arrow 111, and exits from the opposite end thereof in the direction of the arrow 112. A second heat exchange medium, for example the medium to be cooled or heated, enters the heat exchanger 110 through a suitable fitting in one side thereof and flows in the direction of the arrow 113, is circulated through the heat exchanger, and exits through the same fitting or a separate fitting in the direction of the arrow 114. As was the case with the first embodiment, any desired media might be employed; for example, the medium introduced at 111 may be water and that introduced at 113 may be oil.

The details of the heat exchanger 110 are shown in FIGURES 6, 6A, 7 and 8. Referring first to FIGURES 6, 6A and 7, it may be seen that the heat exchanger 110 comprises a tube 115 in which, according to one method of producing the heat exchanger, there may be situated two cylindrical screens 116 and 117. Between the screens 116, 117 are situated a plurality of tubes 118 similar to the tubes 18 of the first embodiment, the tubes 118 being shown more clearly in FIGURE 6A. The screens 116, 117, and tubes 118 are secured to header plates 119, 120, in the same fashion as was the case with the first embodiment. Thus, it will be evident that the tube 115, the screens 116 and 117, the tubes 118, and the header plates 119, 120 take substantially the same form and serve the same function as their analogous structure of the first embodiment referenced respectively by 15, 16, 17, 18, 19 and 20. However, in this embodiment, the header plates 119 and 120 are identical, each having apertures in alignment with the tubes 118, for example as shown at 120'' in FIGURE 8. There is no central opening in either of the plates of this embodiment, for reasons to become evident shortly. The header plates 119 and 120 are each appropriately secured to the tube 115, and suitable fittings 121 and 122 are attached to the end plates 119, 120, respectively.

In a suitable aperture in the tube 115 there is shown a combined inlet and outlet fitting 123 having an inlet opening 124 and outlet opening 125 (see FIGURE 6). While a single fitting has been found to be expeditious, it is evident that separate inlet and outlet fittings may be provided at whatever position they are desired, and that suitable fittings may then be attached for fluid flow outside the exchanger. In any event, the inlet opening 124 communicates with an annular passage 126 formed between the screen 117 and the inner periphery of the tube 115. In this passage 126 there are located a plurality of partitions for dividing the passage 126. Any number of such partitions may be employed; for example, in FIGURE 6 there is shown two partitions 127, 128 extending the full length of the exchanger and separating the passage 126 into a first passage 129 on one side of a line joining the partitions 127, 128 and a second passage 130 on the other side of such a line. Also it will be seen that the screen 116 extending the full length of the heat exchanger leaves a central passage 131.

Between and surrounding the tubes 118 there is provided a body of pervious material 132 extending the full length of the tubes 118. The pervious body 132 may be produced in a number of methods to be indicated. Whatever method is employed, it will be seen that the passageway 126 and the passageway 131 combine to yield a radial flow through the pervious body 132 and hence around the tubes 118. More specifically, a first medium, for example that to be employed in heating or cooling, enters through the fitting 121 and, following the path of the dashed arrows 133, flows through the tubes 118 axially along the length thereof, through the apertures of the header plates 119 and 120, thence out through the fitting 122. The second medium, for example that to be heated or cooled, enters the heat exchanger through the inlet opening 124 of the fitting 123, and following the path of the solid arrows 134, flows into the passageway 129. As can be seen in FIGURE 6, the partitions 127, 128 prevent the flow of the medium from extending directly into the passage 130. Accordingly, the flow from the passage 129 is necessarily through the screen 117 adjacent the passage 129, and through the pervious body 132 and screen 116 to the central passage 131. From the passage 131, the medium must then necessarily flow through the screen 116 and pervious body 132 to the passageway 130, from which it may exit through the exit opening 125 of fitting 123. During such flow, the medium flowing through the pervious body 132 has of course performed its heat exchange function with the medium flowing through the tubes 118.

The heat exchanger of FIGURE 5 thus provides several advantages over that of FIGURE 1. First, the heat exchanger of FIGURE 5 may be employed for "in-line" applications, that is, where it is desired that the flow of one of the media be straight through, as shown by the arrows 111 and 112 of FIGURE 5. Secondly, this embodiment allows for a plurality of passes of one of the media through the pervious body. For example, as shown in FIGURE 6, one of the media passes through the pervious body 132 first on the way to the central passage 131, and a second time on the way out. Obviously, the number of partitions and hence the number of passes through the pervious body may be increased as desired, thus providing further opportunities for heat exchange.

As will be obvious to those skilled in the art, the radial flow of the heat exchanger medium achieved by the instant device attains a high degree of heat exchange with a minimum of pressure drop. The use of radial flow distributes the medium over the entire pervious structure in a uniform manner over a greatly increased heat exchange surface. The construction of the pervious body, as well as of the tubes and the screens, will be dictated by the contemplated use of the exchanger dependent upon such factors as the thermal conductivity, specific heat, viscosity, and corrosive nature of the fluid, the presence of clogging solids in the fluid, and tolerable pressure drops.

It is to be understood that the concept of this invention need not be limited to the particular configuration indicated above. For example, a tube need not be exclusively employed; any desired shape of exchanger may be provided, with the inner tubes and pervious body shaped accordingly to fit. Furthermore, the tubes may be of any desired cross-section, any number of heat exchange media may be employed, the exchanger may be used for either heating or cooling, and the direction of flow of the heat exchange media may take a variety of patterns.

Considering now the novel method by which either of the previously discussed heat exchangers may be produced, reference may be had to FIGURES 9 and 10. Since production of the heat exchanger of FIGURE 5 is basically similar to that of FIGURE 1, the discussion which follows will be directed only to the latter, it being understood that production of the heat exchanger of FIGURE 5 is similar unless indicated to the contrary.

As will be understood, various combinations of metals may be utilized in forming the heat exchangers according to the instant invention; and accordingly the solid portions and the pervious body may be of the same metal or alloy, or the pervious structure and the solid member may be comprised of different compositions. For example, both the pervious body and solid portions may be formed of the same stainless steels, coppers, brass, carbon steels, aluminums or various combinations thereof. As will be evident, the ultimate use of the resultant structure determines the specific combination of alloys to be employed.

The production of the pervious body is most flexible; for example, it may be produced by a process wherein particles, usually spherical, are poured by gravity into an appropriately shaped confined space and usually vibrated to cause the particles to compact uniformly. As is obvious, the choice of particle size will largely determine the size of openings in the resulting pervious body. The body of particles so packed is then treated in accordance with any of the well known metallurgy practices—e.g., sintering, welding, brazing or soldering employing an appropriate coating—to produce a metallic bond between the particles. Thus, there is provided a pervious body whose bulk density, or apparent density, is but a fraction of the density of the metal or alloy from which the particles are obtained. Furthermore, such process results in a metallic bond between the pervious body and solid material around or within the body.

While the above described process of forming the pervious body is preferred in the instant invention, other processes may be employed. For example, it is possible to blend intimately a particulate material with either a combustible substance or a soluble material whose melting point exceeds the sintering temperature of the particulate material. After the blend is compacted and treated to achieve a metallic bond, the combustible substance may be burned away or the soluble material removed by leaching or dissolving with a liquid. A still further method of producing the pervious body comprising melting a metal or alloy and casting it into the interstices of a loose aggregate of a particulate soluble material whose melting point exceeds that of the metal, preferably having a specific gravity of the molten metal. Upon solidification of the metal, a component is produced which contains the network of the soluble material interspersed within the solid metal which soluble material is thereupon removed by leaching or dissolving, leaving behind it interstices that interconnect and form a pervious network within the resultant metal body. A still further method of producing such pervious bodies comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

It will be evident that the pervious body 29 may be fabricated about the tubes 18 in any of the methods indicated hereinbefore. The pervious body 29 with the tubes 18 encased therein may then be joined to the header plates 19, 20 and inserted into the tube 15. By one method of encasing the tubes 18 in the pervious body, cylindrical screens 16, 17 are employed. The tubes are first positioned in the desired pattern between the header plates in alignment with the apertures therein, and then the smaller screen 16 is placed on the inside diameter of the space formed by the innermost edges of each of the tubes 18, which space forms the passage 30. The larger cylindrical screen 17 is then placed about the tubes 18 circumscribing the outermost edges thereof. These cylindrical screens extend the full distance between the header plates and may be of any desired material, for example 50 x 50 mesh copper screening. Following these initial steps, the space between and around the tubes 18 may be filled by gravity with the desired particulate material which will be contained in the space between screens 16 and 17. Following known metallurgical processes, the entire assembly may then be brazed, resulting in a secure metallic bond between (A) the various particles of the pervious body, (B) the pervious body and each of the screens 16, 17, (C) the pervious body and each of the header plates 19, 20, and (D) the pervious body and the tubes 18.

In a preferred method of construction it is not necessary to employ such screens. Thus, as shown in FIGURES 9 and 10, tubes 18 are positioned in the desired relationship between a center core 50 and a surrounding tube 51. Tube 51 comprises two split halves 52, 53 suitably held together as by a surrounding sleeve or a clamping device. Core 50 and tube 51 may be suitably supported on header plate 19, with tubes 18 projecting through the apertures in plate 19 provided therefor. At the upper portions of the assembly, the upper ends of tubes 18 may be securely held in header plate 20 in the apertures provided therefor. In the case of the heat exchanger of FIGURE 1, plate 20 will have a central aperture present (see FIGURE 3), which aperture may be used to receive the projecting end of core 50; in the case of the heat exchanger of FIGURE 5, a central aperture will have to be made in header plate 120 (see FIGURE 7) to receive the projecting end of core 50.

For reasons to become evident shortly, core 50 and tube 51 are of a material which would be unaffected by any of the previously discussed methods of achieving a metallic bond—e.g., carbon or ceramic—or of metal coated with any of the well known stop-off materials—e.g., aluminum oxide—to prevent a metallic bond between the metal core and any other body.

Once the tubes 18 have been correctly positioned, particulate material may be poured through appropriate apertures in header plate 20 into the space between core 50 and tube 51 not occupied by tubes 18. Following any of the metallurgy procedures previously discussed, the particulate material may then be treated to achieve a metallic bond between the various particles and between the particulate material and the tubes 18, to form pervious body 29. No metallic bond will be created between body 29 and either core 50 or tube 51, due to the composition of these elements indicated before.

Following such treatment, core 50 may be removed, as by pulling it out of the assembly with an appropriate tool inserted in aperture 55 of the core 50. The apertures in header plate 20 through which the particulate material was introduced—and, in the case of the heat exchanger of FIGURE 7, the central aperture—may then be resealed. Tube 51 may be removed by separating the two halves 52 and 53 thereof, and the resulting assembly located within a larger tube. In the case of the heat exchanger of FIGURE 1, elements 21, 22, 25 and 28 are attached in any conventional fashion and then secured within tube 15 (see FIGURE 3). In the case of the heat exchanger of FIGURE 5, elements 121 and 122 are attached in any conventional fashion and then secured within tube 115 (see FIGURE 7). Addition of the required fittings completes the fabrication, and the heat exchanger is ready for use.

While several specific embodiments which result from the method of this invention have been shown and described, they are to be understood as for the purpose of illustration only and that various changes and modifications may be made in the disclosed method without departing from the spirit and scope of the invention as set forth in the appended claims.

What is claimed is:

1. A method for producing a tubular heat exchanger having a plurality of first tubular means arranged radially around a void within a second tubular conduit means, the method comprising (A) positioning a central removable core within a tubular member, (B) positioning and supporting a plurality of first tubular conduit means in the space between said core and said tubular member, said conduit means being radially arranged, (C) introducing a particulate metallic material into the space between said core and said tubular member not occupied by said conduit means, (D) forming a metallic bond between the individual particles of said particulate material and between said particulate material and said conduit means, to form a pervious body surrounding said conduit means, (E) removing said core to form a passage centrally of said pervious body, (F) removing said tubular member, and (G) positioning said pervious body within a second conduit means.

2. The method of claim 1 wherein each of said core and said tubular member is of a material unaffected by said metallic bond.

3. The method of claim 1 wherein each of said core and said tubular member comprise a metal coated with a material unaffected by said metallic bond.

4. The method of claim 1 wherein said tubular member comprises two semi-cylindrical members removably joined together.

5. A process according to claim 1 in which in step D, the metallic bond is formed by brazing.

6. A process according to claim 1 in which in step D, the metallic bond is formed by sintering.

7. A process according to claim 1 in which appropriate connecting fixtures are attached to, respectively, said pervious body, and said second conduit means so that one heat exchange medium passes through the particulate material and the other heat exchange medium passes through said first tubular conduit means.

References Cited

UNITED STATES PATENTS

| | | | |
|---|---|---|---|
| 2,401,797 | 6/1946 | Rasmussen. | |
| 3,201,858 | 8/1965 | Valyi. | |
| 3,262,190 | 7/1966 | Rostoker et al. ______ | 29—157.3 |
| 3,263,314 | 8/1966 | Smeltzer et al. ______ | 29—157.3 |

FOREIGN PATENTS

| | | |
|---|---|---|
| 472,154 | 6/1952 | Italy. |

CHARLIE T. MOON, *Primary Examiner.*

J. D. HOBART, *Assistant Examiner.*